United States Patent
Bieder et al.

(10) Patent No.: US 10,336,011 B2
(45) Date of Patent: Jul. 2, 2019

(54) METHOD FOR PRODUCING A SANDWICH COMPONENT AND SANDWICH COMPONENT

(71) Applicant: Daimler AG, Stuttgart (DE)

(72) Inventors: Hubert Bieder, Denkendorf (DE); Tobias Blumenstock, Stuttgart (DE); Benno Stamp, Ostfildern (DE); Roman Wittig, Magstadt (DE)

(73) Assignee: Daimler AG, Stuttgart (DE)

( * ) Notice: Subject to any disclaimer, the term of this patent is extended or adjusted under 35 U.S.C. 154(b) by 214 days.

(21) Appl. No.: 15/113,746

(22) PCT Filed: Dec. 16, 2014

(86) PCT No.: PCT/EP2014/003386
§ 371 (c)(1),
(2) Date: Jul. 22, 2016

(87) PCT Pub. No.: WO2015/090574
PCT Pub. Date: Jun. 25, 2015

(65) Prior Publication Data
US 2017/0066201 A1 Mar. 9, 2017

(30) Foreign Application Priority Data

Dec. 17, 2013 (DE) .......................... 10 2013 021 195
Apr. 26, 2014 (DE) .......................... 10 2014 006 133
(Continued)

(51) Int. Cl.
*B29C 70/08* (2006.01)
*B29C 70/46* (2006.01)
(Continued)

(52) U.S. Cl.
CPC ...... *B29C 70/086* (2013.01); *B29C 45/14008* (2013.01); *B29C 45/1418* (2013.01);
(Continued)

(58) Field of Classification Search
CPC .................................................... B29C 70/086
See application file for complete search history.

(56) References Cited

U.S. PATENT DOCUMENTS 3,059,312 A 10/1962 Jamieson
3,122,141 A 2/1964 Crowe, Jr.
(Continued)

FOREIGN PATENT DOCUMENTS

AT 407 237 B 1/2001
CN 1174149 A 2/1998
(Continued)

OTHER PUBLICATIONS

PCT/EP2014/003386, International Search Report dated May 6, 2015 (Three (3) pages).
(Continued)

*Primary Examiner* — Daniel H Lee
(74) *Attorney, Agent, or Firm* — Crowell & Moring LLP

(57) ABSTRACT

A method for producing a sandwich component, in particular an inner trim component for a motor vehicle, is disclosed. The method begins with a core layer made from a foamed plastic and a cover layer which includes reinforcing fibers and plastic fibers. The plastic of the core layer has a first melting temperature which is higher than the second melting temperature of the plastic fibers of the cover layer. By the core layer being arranged on the cover layer, a multilayer composite is created. This multilayer composite can be further processed into a semi-finished product. The multilayer composite or the semi-finished product is then heated in a heating device to a temperature which is lower than the
(Continued)

first melting temperature but therefore higher than the second melting temperature. Then the heated multilayer composite or the semi-finished product is formed in a forming tool in order to produce the sandwich component.

22 Claims, 7 Drawing Sheets

(30) Foreign Application Priority Data

Jul. 15, 2014 (DE) .................. 10 2014 010 478
Jul. 15, 2014 (DE) .................. 10 2014 010 481

(51) Int. Cl.

| | | |
|---|---|---|
| B32B 5/24 | (2006.01) | |
| B29D 99/00 | (2010.01) | |
| B32B 37/04 | (2006.01) | |
| B29C 51/14 | (2006.01) | |
| B29C 45/14 | (2006.01) | |
| B42B 4/00 | (2006.01) | |
| B29C 70/48 | (2006.01) | |
| B32B 5/06 | (2006.01) | |
| B32B 27/12 | (2006.01) | |
| B32B 27/32 | (2006.01) | |
| B32B 27/36 | (2006.01) | |
| B29L 31/30 | (2006.01) | |
| B32B 37/00 | (2006.01) | |
| B32B 37/10 | (2006.01) | |
| B32B 37/20 | (2006.01) | |
| B32B 38/00 | (2006.01) | |
| B29C 45/00 | (2006.01) | |

(52) U.S. Cl.
CPC .. *B29C 45/14336* (2013.01); *B29C 45/14786* (2013.01); *B29C 51/145* (2013.01); *B29C 70/465* (2013.01); *B29C 70/48* (2013.01); *B29D 99/0021* (2013.01); *B32B 5/06* (2013.01); *B32B 5/245* (2013.01); *B32B 27/12* (2013.01); *B32B 27/32* (2013.01); *B32B 27/36* (2013.01); *B32B 37/04* (2013.01); *B42B 4/00* (2013.01); B29C 2045/0093 (2013.01); B29L 2031/3005 (2013.01); B29L 2031/3014 (2013.01); B32B 37/0076 (2013.01); B32B 37/1027 (2013.01); B32B 37/203 (2013.01); B32B 38/0004 (2013.01); B32B 2038/008 (2013.01); B32B 2305/022 (2013.01); B32B 2305/07 (2013.01); B32B 2305/18 (2013.01); B32B 2305/70 (2013.01); B32B 2307/738 (2013.01); B32B 2309/02 (2013.01); B32B 2309/12 (2013.01); B32B 2605/003 (2013.01)

(56) References Cited

U.S. PATENT DOCUMENTS

| | | |
|---|---|---|
| 3,532,588 A | 10/1970 | Newman |
| 4,461,099 A | 7/1984 | Bailly |
| 5,709,925 A | 1/1998 | Spengler et al. |
| 8,945,327 B2 | 2/2015 | Stamp et al. |
| 2006/0255626 A1* | 11/2006 | Asbury .............. B32B 5/26 296/214 |
| 2012/0315429 A1* | 12/2012 | Stamp .............. B29C 70/028 428/72 |

FOREIGN PATENT DOCUMENTS

| | | |
|---|---|---|
| CN | 101184606 A | 5/2008 |
| DE | 38 11 778 A1 | 11/1988 |
| DE | 42 41 516 C1 | 8/1993 |
| DE | 43 23 590 A1 | 3/1994 |
| DE | 198 19 750 A1 | 11/1999 |
| DE | 101 50 678 A1 | 5/2003 |
| DE | 10 2004 051 929 A1 | 4/2006 |
| DE | 10 2006 058 257 A1 | 6/2008 |
| DE | 20 2009 015 059 U1 | 2/2010 |
| DE | 10 2008 039 869 A1 | 3/2010 |
| DE | 10 2010 005 456 A1 | 7/2011 |
| DE | 10 2010 047 105 A1 | 4/2012 |
| DE | 10 2012 006 609 A1 | 10/2013 |
| EP | 0 393 476 A1 | 10/1990 |
| EP | 0 787 578 A2 | 8/1997 |
| EP | 2 503 040 A1 | 9/2012 |
| WO | WO 2005/016700 A2 | 2/2005 |
| WO | WO 2006/110718 A2 | 10/2006 |

OTHER PUBLICATIONS

Chinese Office Action issued in Chinese counterpart application No. 201480073010.6 dated Feb. 23, 2017, with partial English translation (Nineteen (19) pages).

* cited by examiner

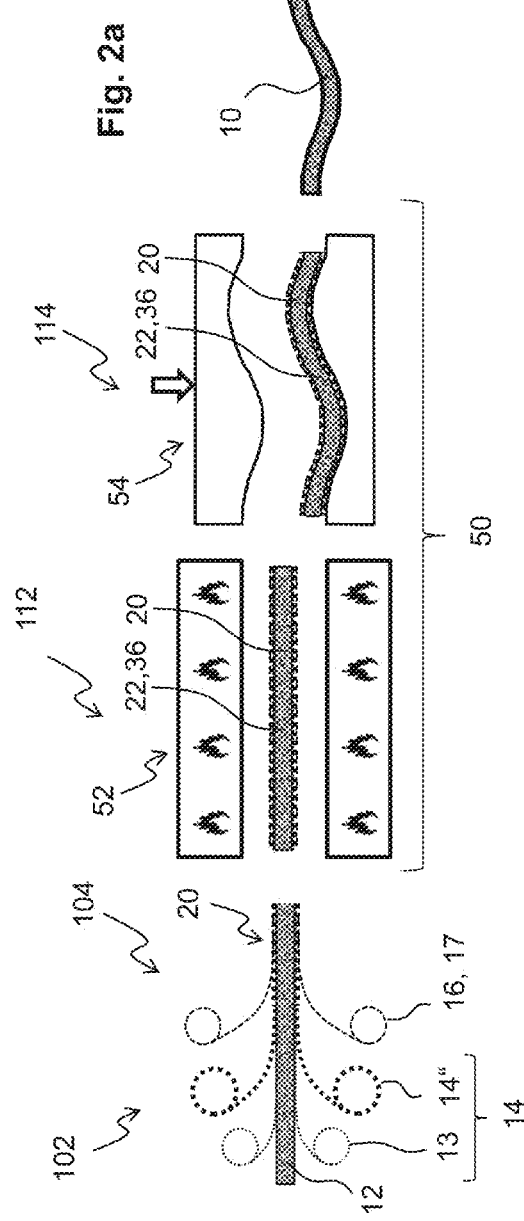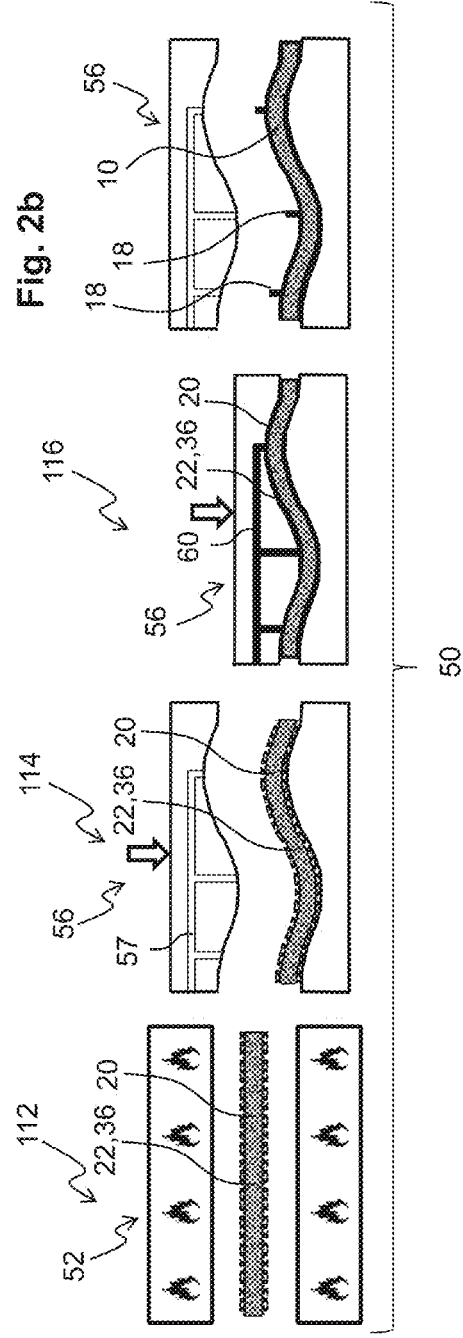

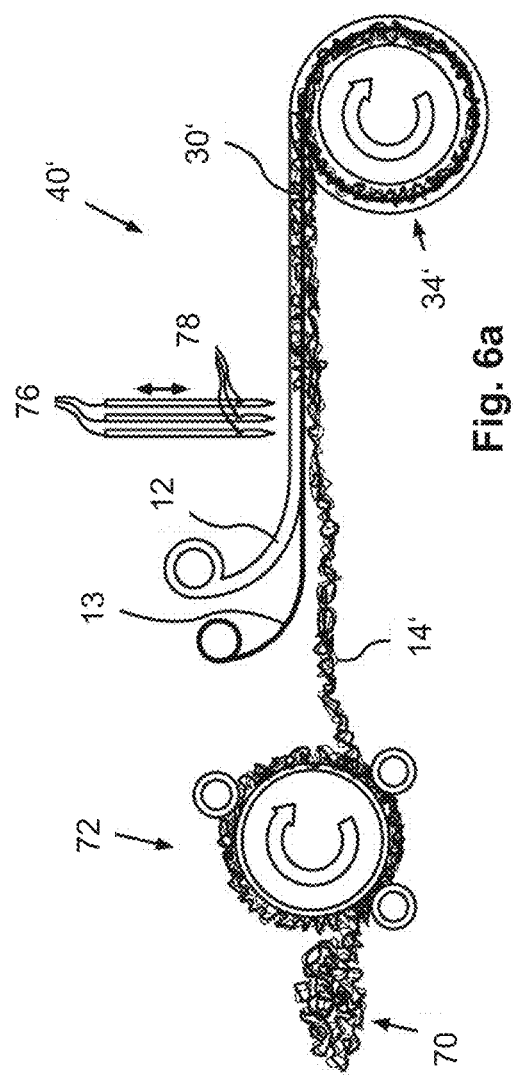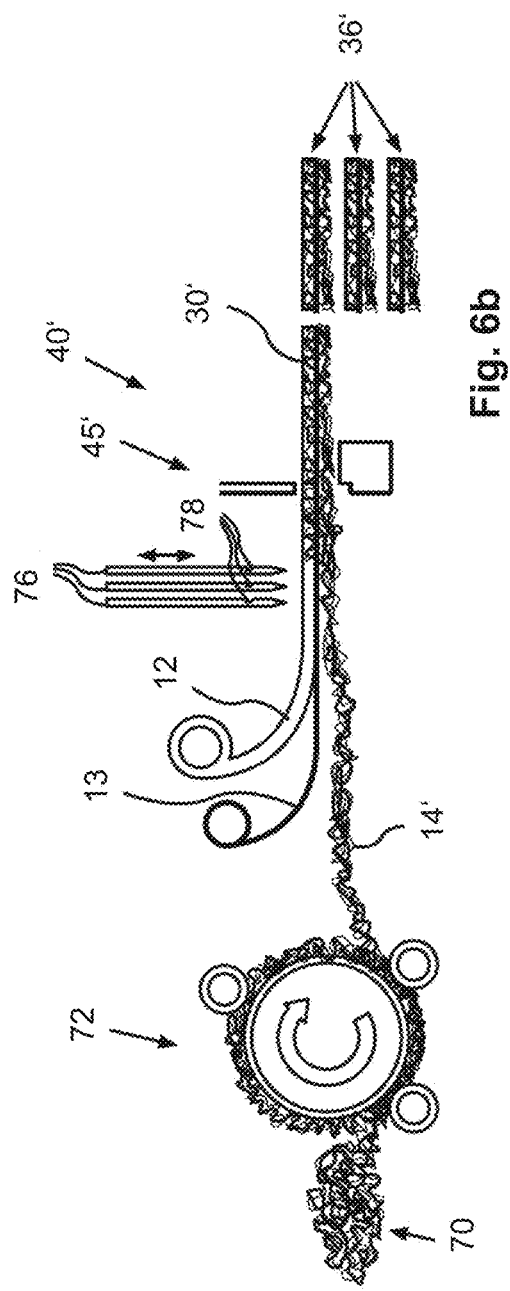

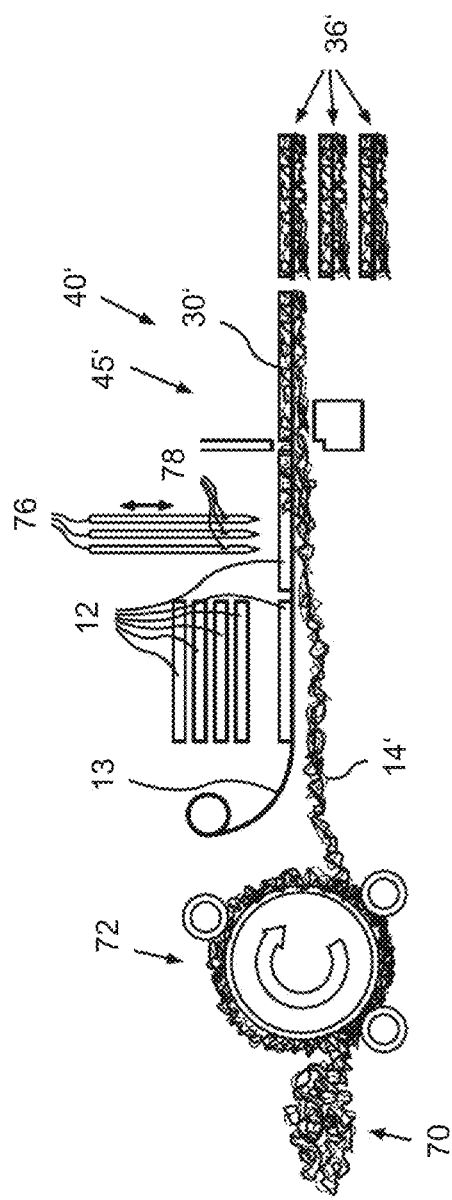
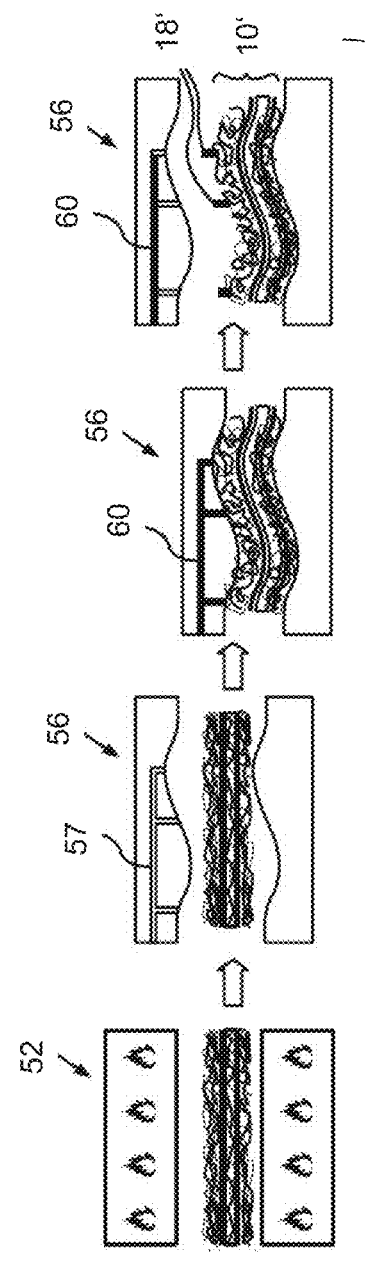

METHOD FOR PRODUCING A SANDWICH COMPONENT AND SANDWICH COMPONENT

BACKGROUND AND SUMMARY OF THE INVENTION

The invention relates to a method for producing a sandwich component, in particular an inner trim component for a motor vehicle. Furthermore, the invention relates to a sandwich component, in particular an inner trim component for a motor vehicle.

Such sandwich components made from multilayer composite material have been used for a long time, above all in the technology sector for air and space travel and above all distinguish themselves by their particularly low weight and their direction-dependent stiffness. Therefore, for example, a sandwich component can withstand particularly large loads (for example tensile stress) in a direction in parallel to the individual layers of the composite material, whereas different loading limits apply for loading perpendicular to the layers of the plastic component. In other words, therefore, by targeted use of different materials (for example honeycomb core, laminated fiber layer), a direction-dependent component stiffness is set and therefore, in particular, weight is saved.

For producing such a sandwich component, a method is known from DE 43 23 590 A1, in which a core layer made from a thermoplastic foam and thermoplastic cover layers are stacked and assembled in a single hot pressing procedure and formed into the component. The cover layers can here in particular consist of thermoplastic glass fiber woven material.

In the automotive field, trim parts which have been pressed or injected multiple times are used which have, however, a relatively high surface weight. Trim parts made from pressed parts, for example for door inner trims, consist, for example, of polypropylene natural fiber non-woven materials and have relatively low stiffness. Furthermore, there are also sandwich components, for example made from polyurethane materials, which, however, are relatively expensive and have high cycle times for their production.

A method is known from DE 10 2012 006 609 A1 in which a decorative layer is provided on at least one side of a heated sandwich semi-finished product, as well as a foam layer between the decorative layer and the sandwich semi-finished product. The heated sandwich semi-finished product is transferred into a potentially pre-heated forming press and inserted into a mold cavity in such a way that the side of the sandwich semi-finished product forms the visible side of the sandwich component with the foam layer and the decorative layer. In other words, therefore, to produce this sandwich component, firstly the sandwich semi-finished product (here consisting of cover layers and a paper honeycomb core, as well as PP films (polypropylene films) as an intermediate layer for cover layer connection) is heated in a heating press until respective thermoplastic fibers of the cover layers are melted. In connection to this, the foam layer and the decorative layer are arranged on the sandwich semi-finished product, wherein a mutual shaping of the decorative layer, the foam layer and the sandwich semi-finished product occurs in a forming press. The production of the connection between the material layers takes place here during the cooling of the sandwich materials. This method enables the cost-effective production of a so-called laminated sandwich component, in which any surface errors of the sandwich component are prevented particularly effectively, but operation requires increased production expenditure.

An object of the present invention is to provide a method in which a sandwich component can be produced with particularly low expenditure. Furthermore, an object of the present invention is to provide a sandwich component which is able to be produced particularly simply.

The method according to the invention is based on a core layer made from a foamed plastic and a cover layer which comprises reinforcing fibers and plastic fibers. Here, the plastic of the core layer has a (first) melting temperature which is higher than the (second) melting temperature of the plastic fibers of the cover layer. By the core layer being arranged on the cover layer, a multilayer composite is created. Using further process steps, this multilayer composite can be further processed into a semi-finished product. The multilayer composite or the semi-finished product produced therefrom is then heated in a heating device to a temperature which is lower than the first melting temperature (of the foamed core layer), but higher than the second melting temperature (of the plastic fibers of the cover layer). Then the multilayer composite heated in this way or the semi-finished product heated in this way is formed in a forming tool in order to generate the sandwich component.

Using the method according to the invention and the associated material system, it is ensured that the core layer and the cover layer do not form a substantial chemical bond during the heating of the multilayer composite, but that, instead of this, an adhesive, positive or mechanical connection is produced between the core layer and the cover layer. Due to the fact that, during the heating of the multilayer composite, a temperature above the melting temperature of the cover layer, but below the melting temperature of the core layer is selected, only the thermoplastic portion of the cover layer is melted. The foamed plastic of the core layer, however, does not melt and therefore remains almost stable during the processing. The hot cover layer(s) of the heated multilayer composite are consolidated during the forming in the forming tool, without the hot foam being substantially compressed. The form stability of the hot foam, the formability of the cover layer(s) and the counter pressure of the hot foam in the forming tool are thereby high enough to achieve consolidation of the cover layer(s).

Using the method according to the invention, it is therefore possible that the foamed plastic of the core layer remains approximately stable during the production process of the semi-finished product and does not collapse in on itself. Furthermore, the thus produced semi-finished product has particularly good forming properties.

Advantageously, a core layer which has open pores at least on its surface is used as a core layer. In other words, the provided core layer has an open-pore foam or at least the surface of the provided core layer has open pores or a rough, unclosed surface. The latter can occur, for example, during the production of corresponding foam plates which serve as an initial material for the core layer, by sawing out the foam plates from large foamed blocks. Alternatively, the surface of a closed-pore core layer can be pre-treated by needling or wetting or another means of roughening.

The cover layer advantageously comprises a thermoplastic fiber-reinforced textile structure, so a hybrid textile, such as, for example, a non-woven material, a woven material or a scrim made from reinforcing fibers and thermoplastic fibers which later form the matrix of the cover layer. Corresponding reinforcing fibers can, for example, consist of glass, carbon, aramid, or natural fibers or similar.

The use of unconsolidated cover layers made from hybrid textiles consisting of a reinforcing fiber (e.g. glass, natural, or carbon fibers, etc.) and a thermoplastic fiber which forms the matrix after the heating/forming of the multilayer composite is particularly advantageous, because unconsolidated materials have better forming behavior than consolidated. In this case, the consolidation of the cover layer only occurs in the forming tool/pressing tool, where the hot cover layer is consolidated without the hot foam of the core layer being substantially compressed, and where an impregnation of the reinforcing fibers by the melted thermoplastic fibers (preferably PP fibers) occurs. Since the cover layer is therefore only consolidated in the forming tool/pressing tool, the properties, in particular the degree of consolidation, of the cover layer can be adjusted by the foam pressure. Here, for example, a low consolidation of the cover layer can lead to an increase in the stiffness of the sandwich component since the thickness and the moment of inertia of area are increased. Furthermore, due to a low consolidation of the cover layers, surface errors on the component which, for example, are set due to inhomogeneous non-woven material cover layers, can be prevented. The form stability and therefore the counter pressure of the hot foam is sufficient to consolidate the cover layers sufficiently. A further advantage of the use of unconsolidated semi-finished products consists in that they are substantially more cost-effective.

It is particularly advantageous to use a hybrid non-woven material/hybrid needle-punched non-woven material having PP fibers as a cover layer, since this has particularly good expansion properties, high material isotropy, low costs and global availability. Due to the high expandability, such an unconsolidated non-woven material cover layer is particularly well suited to forming and to the formation of a thin cover layer on the hot, pressure-sensitive foam core layer. If, however, a woven material is used for the cover layer, then this leads—due to the clearly lower expansion property—to an increased loading of the foam during the forming in areas with small radii, since here the foam is loaded heavily with pressure due to the low expansion property of the woven material.

In an advantageous development of the invention, the cover layer additionally comprises a melt layer made from a thermoplastic having a third melting temperature which is lower than the first melting temperature and, as a maximum, as high as the second melting temperature. This melt layer is preferably a thermoplastic film, but the melt layer can also be formed by a local, thermoplastic enrichment or thermoplastic coating of the cover layer. The melt layer advantageously consists of the same thermoplastic material as the thermoplastic portion of the cover layer. Using the melt layer, the cover layer connection to the core layer can be improved and the core layer itself can be protected from moisture. The melt layer is arranged between the core layer and the fibers of the cover layer during the formation of the multilayer composite. During the heating of the multilayer composite to a temperature above the melting temperature of the melt layer, but below the melting temperature of the core layer, the melt layer (and potentially a thermoplastic portion of the cover layer) is melted. The melted thermoplastic material of the melt layer here penetrates open pores of the foamed plastic of the core layer and therefore forms a mechanical and anchoring and/or abrasive bond to the core layer. The melted thermoplastic of the melt layer is bonded to the cover layer either by mechanical anchoring in the relevant fiber non-woven material of the cover layer or to the likewise melted thermoplastic portion of the cover layer.

In a particularly advantageous embodiment of the invention, it is provided that the fibers of the cover layer are produced from polypropylene (PP) and the core layer from polyethylene terephthalate (PET). Furthermore, the optionally provided melt layer can also consist of polypropylene (PP). Polypropylene has a melting temperature of approx. 160° C., whereas polyethylene terephthalate only melts from approx. 250° C. It can thereby be ensured that the respective melting temperatures of the melt layer and the fibers of the cover layer as well as the core layer are far enough away from each other that a reliable implementation of the method can be ensured during heating of the multilayer composite. Furthermore, polypropylene and polyethylene terephthalate are relatively favorable initial materials which can additionally be bonded cost-effectively to a material composite without forming a chemical bond with each other.

According to a further advantageous embodiment of the invention, it is provided that an additional layer having a fourth melting temperature which is higher than the second melting temperature is arranged on the cover layer, forming the multilayer composite. The additional layer can, for example, be produced from PES or polyamide (PA). Due to the fact that the additional layer has a melting temperature which is higher than the second melting temperature, an adhesion of the multilayer composite to the heating device can be prevented in which the multilayer composite is heated during the production of the sandwich component.

A further advantageous embodiment of the invention provides that a decorative layer, in particular together with a further melt layer made from the same thermoplastics as the other melt layer, is arranged on the cover layer, forming the multilayer composite.

A further advantageous embodiment of the invention provides that the layers of the multilayer composite are connected to a semi-finished product at least in regions before the process steps of heating/forming.

The handling of the thus produced semi-finished product therefore hardly differs from a single-layer material, for example from a non-woven material, and additionally has a very high flexibility. Manufacturers of pressed, injected or back-injected components in which such a semi-finished product is used therefore no longer have to have partly very costly sorting devices in order to be able to produce corresponding sandwich components from the semi-finished product produced according to the invention. The semi-finished product production, in particular the arrangement of the individual layers of a sandwich component, can therefore be decoupled from the actual production of the sandwich component (by heating and forming). In this way, it is possible to decouple the production of the semi-finished product for a fiber composite component from the actual production process of the sandwich component in time and/or in space. Due to the partial connection of the individual layers to a preconfigured multilayer composite, the semi-finished product produced with the aid of the method according to the invention is able to be stored and transported; the semi-finished product can therefore, for example, be produced separately at a manufacturer of semi-finished products (e.g. a manufacturer of foam material or a manufacturer of non-woven material) and then can be transported to a component manufacturer who produces sandwich components from the semi-finished product. In this way, a clear simplification of the production process of the sandwich component following the production of the semi-finished product can be achieved. In particular, the component quality can thereby be increased and the cycle time during the component production can be reduced. Furthermore, the production and storage of the semi-finished product can be outsourced to a manufacturer of semi-finished products, whereby system investments can be reduced for the component manufacturer.

Alternatively, the semi-finished product can be supplied directly, so without intermediate storage, to the processing process, by means of which the sandwich component is produced. In this case, the production of the semi-finished product is coupled directly to the production of the sandwich component, without the semi-finished product being stored intermittently.

The semi-finished product can be produced in the form of a continuous material and arranged in roll form or can be configured into semi-finished product component parts.

After the connection of the layers to generate the semi-finished product, expediently in a further step, a rolling up of the semi-finished product into at least one semi-finished product roll and/or an assembly of the semi-finished product into several component parts as well as the formation of at least one component part stack of the component parts occurs. In a further method step, a provision of the semi-finished product to the finishing device occurs by unrolling the at least one semi-finished product roll and distributing the unrolled semi-finished product into several unrolled parts and/or unstacking of the component parts of the at least one component part stack. After this, the completed sandwich component is produced from at least one unrolled part and/or at least one component part in the finishing device by heating and forming.

The semi-finished product produced from the core layer as well as the at least one cover layer is therefore either rolled up into a semi-finished product roll and, additionally or alternatively, divided into the component parts, which are also referred to as plates, and stacked up into the component parts stack. The thus produced semi-finished product already comprises all desired layers of the plastic component, wherein additionally, for example, a decorative layer can also be provided which provides the component semi-finished product and therefore the plastic component formed therefrom with a particularly high quality. This decorative layer can even be added only after the heating of the semi-finished product for protection of the material. Depending on whether the semi-finished product is rolled up into the semi-finished product roll or is already divided and therefore configured into the several component parts having the desired length, the semi-finished product is still only unrolled in the finishing device and the unrolled semi-finished product is divided into the unrolled parts with lengths as desired or the component parts which already have a length as desired due to the assembly are unstacked from the component part stack. Correspondingly, no further layers have to be added to the semi-finished product in the finishing device, but the at least one unrolled part (of the semi-finished product roll) or the at least one component part (of the component part stack) merely undergoes the heating and forming described above in order to produce the sandwich component from the semi-finished product.

The sorting of the individual layers (here: core layer, cover layer and potentially additional and/or decorative layer) of the sandwich component is therefore not coupled to the further processing process. In other words, the production of the semi-finished product can therefore occur in the prefabrication device and the semi-finished product can correspondingly be transported as a semi-finished product roll or component part stack to the finishing device. The finishing device can correspondingly be formed particularly simply since no further tools must be provided for additional application of further layers to the semi-finished product. The individual sandwich layers can therefore be processed into the semi-finished product in the preliminary stage, so in the prefabrication device, wherein only the heating and forming of the semi-finished product occurs in the finishing device. It is therefore possible to decouple the production of the semi-finished product for a fiber composite component from the actual production process of the fiber composite component in time and/or in location.

Advantageously, for the production of the semi-finished product, the core layer and the cover layer (and potentially further layers) are connected using heat; this occurs in a prefabrication device which can be located with the manufacturer of the sandwich component, but alternatively also with a supplier.

In an advantageous embodiment of the semi-finished product production, the layers of the multilayer composite are connected by local melting of the cover layer, and the layers of the multilayer composite partially connected in this way are then preconfigured into the semi-finished product. Alternatively, the cover layer can be connected completely to the foam material core layer; in this case, instead of an only local heating and melting of the thermoplastic plastic of the decorative layer, this is completely melted and therefore also completely connected to the foam material core layer.

In particular, it is advantageous to connect the layers of the multilayer composite to each other continuously by means of a heated roller belt or a heated roller press. A particularly high production rate can thereby be achieved during the production of the semi-finished product. The semi-finished product is here produced in the form of a continuous material and can, for example, be rolled up into a roll.

Alternatively, the layers of the multilayer composite can be connected to one another discontinuously by means of a heated pressing tool. In other words, a pressing unit which is heated in a stationary manner is therefore used, wherein in this case, the semi-finished product is preconfigured directly and, for example, can be provided in the form of cuttings or similar. Alternatively, the layers of the heated multilayer composite can be connected to one another discontinuously by means of a cold pressing tool.

Several consolidating surfaces can be formed on the semi-finished product, at which the cross-section of the semi-finished product is locally compressed more strongly than regions which are different to the consolidating surfaces.

Alternatively to the thermal connection of the layers of the multilayer composite, for the production of the semi-finished product, the layers of the multilayer composite can also be connected to one another mechanically, in particular by needling. This is recommended in particular if the cover layer comprises a fibrous web and/or fibrous non-woven material; furthermore, the cover layer also advantageously comprises a melt layer made from a thermoplastic plastic. The fibrous web and core layer are then connected by piercing at least one needle having a barb into the core layer and the fibrous web and then guiding the needle out from the core layer and the fibrous web. Here, during piercing and/or pulling out of the needle, single or multiple fibers of the fiber web and/or fiber non-woven material are hooked with the barb and anchored mechanically to the core layer during piercing and/or guiding out of the needle. Alternatively or additionally, the needle can firstly pierce the fibrous web/fibrous non-woven material and only then the core layer, such that the needle already pushes fibers through the core layer during piercing, which causes a mechanical anchoring of the core layer to the fibrous web/fibrous non-woven material.

In a preceding method step, firstly a fiber mixture can be provided which comprises the thermoplastic fibers and the reinforcing fibers. Then, this usually inhomogeneous fiber mixture can be processed into the fibrous web by carding. Furthermore, an additional layer, so an upper layer, made from a material having a higher melting temperature than that of the thermoplastic fibers can be arranged on the fibrous web. This additional layer can in particular consist of a polyester, polyamide or of a glass material and causes adhesions to a surface of a heating device serving to heat the semi-finished product to be prevented.

After production of the sandwich component by heating and forming the multilayer composite or the semi-finished product, in a further process step, at least one plastic element can be fixed to the sandwich component produced in this way. The plastic element can in particular be a stiffening element. Such stiffening elements can, for example, be implemented by injected or adhered ribs, as well as by other material accumulations or beading or depressions on the plastic component. Therefore, the possibility exists of an additional and local stiffening of the sandwich component which particularly conforms to the requirements by means of such stiffening elements and connection elements to adjacent components.

Alternatively, after the forming of the semi-finished product, at least one element is injected onto this by means of the same tool, and in such a case, by means of a combined injection pressing tool. In other words, optionally, therefore one or more plastic components or elements serving as reinforcing elements can be injected onto the semi-finished product in the forming tool. The injection molding material can here contain filler or even reinforcing materials. In a simple way, a pressing procedure can thereby be combined with an injection procedure during the production of the sandwich component. During the production of the sandwich component, this can therefore remain in one and the same tool until its completion. Costly handling tasks during the production of the sandwich component therefore do not have to be carried out, such that the sandwich component can be produced quickly and with particularly low cost.

The sandwich component according to the invention, in particular inner trim component for a motor vehicle, is produced by means of the method according to the invention for producing the sandwich component or an advantageous embodiment of the method according to the invention for producing the sandwich component. In comparison to pressed components, the sandwich component according to the invention has a particularly low specific weight. Furthermore, this can be produced particularly cost-effectively and efficiently, since the semi-finished product is used to produce the sandwich component. Additionally, the sandwich component can comprise, to a certain extent, recycled materials, whereby a particularly good ecological footprint is able to be achieved.

Further advantages, features and details of the invention result from the subsequent description of preferred exemplary embodiments and by means of the drawings. The features and feature combinations referred to above in the description as well as the features and feature combinations referred to below in the description of the figures and/or shown solely in the figures are not only applicable in the respectively specified combination, but also in other combinations or alone, without leaving the scope of the invention.

Exemplary embodiments of the invention are explained below by means of schematic drawings.

BRIEF DESCRIPTION OF THE DRAWINGS

FIG. 2a is a schematic depiction of the method sequence of FIG. 1a;

FIG. 2b is a schematic depiction of an alternative embodiment of the method sequence of FIG. 1a;

FIG. 6a is a schematic depiction of an alternative method sequence for producing a semi-finished product for a sandwich component, wherein the semi-finished product is produced in the form of a continuous material by means of a fibrous web comprising thermoplastic fibers, and reinforcing fibers and by means of a core layer comprising a foamed plastic, as well as a thermoplastic melt layer;

FIG. 6b is a schematic depiction of an alternative method sequence for producing the semi-finished product in which the semi-finished product produced as a continuous material is configured into semi-finished product component parts;

FIG. 6c is a schematic depiction of a further alternative method sequence for producing the semi-finished product;

FIG. 7b is a further schematic detailed view of the semi-finished product, wherein this has a different layer structure to the embodiment shown in FIG. 7a;

FIG. 8b is a schematic depiction of an alternative method sequence for producing a sandwich component, wherein during the production of the sandwich component, several elements made from plastic are injected onto the semi-finished product.

DETAILED DESCRIPTION OF THE DRAWINGS

Figure 1A:
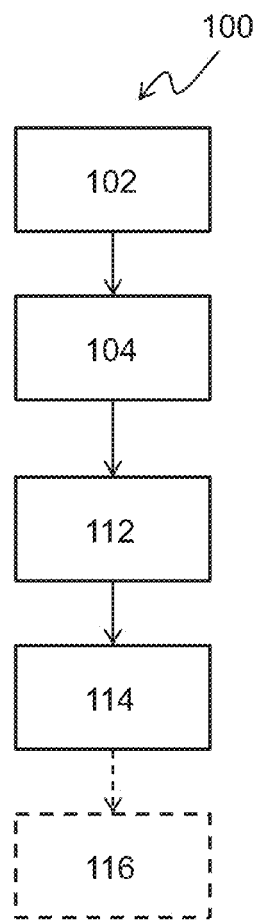
FIG. 1a is a diagram of a first method sequence for producing a sandwich component in which a multilayer composite made from a foamed layer and a cover layer in a heating device is heated and is formed in a forming tool.

In the figures, identical or functionally identical elements are provided with the same reference numerals.

FIGS. 1a and 2 show a flow diagram or a schematic depiction of a method 100 for producing a sandwich component 10 having a core layer 12 made from a foamed plastic. In a first process step 102, a core layer 12 comprising a foamed plastic, a cover layer 14 as well as an (optional) additional layer 16 is provided in the form of respective continuous materials.

The core layer 12 serves to increase the inertia of area of the later sandwich component 10. It is produced from polyethylene terephthalate (PET) and has an open-pore design at least on its surface.

The cover layer 14 comprises an unconsolidated fiber-reinforced textile structure 14", for example a non-woven material, a fabric or a woven material. The reinforcing fibers can, for example, be glass, carbon, aramid or natural fibers. The textile structure 14" furthermore has thermoplastic fibers which are produced from polypropylene (PP) in the present exemplary embodiment. The cover layer 14 furthermore comprises a melt layer 13 made from polypropylene (PP) which is provided in the form of a film in the present exemplary embodiment. The optional additional layer 16 is produced from a polyamide (PA).

The core layer 12 formed from polyethylene terephthalate (PET) therefore has a first melting temperature which is considerably higher at approx. 250° C. than the melting temperature of the melt layer 13 formed from polypropylene (PP) and the thermoplastic fibers of the cover layer 14 formed from polypropylene (PP), because polypropylene has a melting temperature of approx. 160° C. The melting temperature of the additional layer 16 formed from PES or polyamide, however, is higher than the melting temperatures of the thermoplastic melt layer 13 or the thermoplastic fibers of the cover layer 14. Alternatively, it is also possible, instead of the additional layer 16, to arrange a decorative layer 17 on the cover layer 14, in particular together with a further melt layer made from the same thermoplastics as the other melt layer 13.

In process step 104, the different layers 12, 14, 16 are arranged one on the other, forming a multilayer composite 20. In the present case, the cover layer 14 is laid on both sides of the core layer 12 respectively and in turn, the additional layer 16 is laid on this, also on both sides, whereby, in other words, the core layer 12 is located in the middle of the multilayer composite 20 and the respective outer sides of the multilayer composite 20 are formed by the additional layers 16. The multilayer composite 20 coated in this way is then supplied to cutting equipment (not shown in the figure), in which sections 22 are separated from the continuous material of the multilayer composite 20. These sections 22 are then—as shown in FIG. 2a—supplied to a heating device 52 of a finishing device 50 for sandwich components 10. The heating device 52 can, for example, be a heating press, an infra-red radiation field, etc. Here, in process step 112, the sections 22 of the multilayer composite 20 are heated convectively, conductively and/or by heat radiation above the melting temperatures of the melt layer 13 and the thermoplastic fibers of the cover layer 14 by means of the heating device 52. The temperature control of the heating device 52 is here selected in such a way that the multilayer composite 20 is increased neither above the melting temperature of the additional layer 16, nor above the melting temperature of the core layer 12 produced from PET. Therefore, only the thermoplastic portions of the cover layer 14, so the melt layer 13 and the thermoplastic fibers of the hybrid textile 14", melt in the multilayer composite 20. The core layer 12, however, does not melt and therefore remains approximately stable during processing, but has an improved plastic deformability at the increased temperature compared to room temperature.

The multilayer composite 20 which is preheated and softened in this way is then supplied in a forming tool 54 into which it is inserted. Potentially, here, further decorative materials can be attached to the multilayer composite 20. In process step 114, the multilayer composite 20 is formed by means of the forming tool 54 in a thermoforming process. The form stability and therefore the counter pressure of the hot foam core layer 12 here lead to a consolidation of the hybrid textile 14" of the cover layer 14. Due to the compression, the melted thermoplastic portions of the multilayer composite 20 furthermore penetrate into the open-pore surface of the core layer 12, such that, after the solidification of the thermoplastic portions, a mechanical connection to the core layer 12 is formed. The molten material of the melt layer 13 is connected either likewise by mechanical anchoring in the fiber non-woven material of the cover layer 14 or chemically to the thermoplastic portion of the hybrid textile 14" of the cover layer 14. Therefore, a fixed composite made from the foamed core layer 12 and the consolidated fiber-reinforced cover layer 14 results.

Then, the section 22 of the multilayer composite 20 formed in this way is cooled, is optionally cut again, forming the sandwich component 10, and is removed from the tool 54.

In FIG. 2b, an alternative method sequence for producing the sandwich component 10 is depicted. The multilayer composite section 22 produced in process step 104 by laying the individual layers one on top of the other and cut according to the desired component contour is likewise heated by means of the heating device 52 in such a way that the cover layer 14 is transferred into the plastic state (process step 112). Then, the thus heated section 22 is inserted into a tool 56 which is formed presently as a combined injection-pressing machine.

The tool 56 has corresponding channels 57 for supplying a plastic material 60. The preheated multilayer composite 20 is in turn firstly formed by means of the tool 56 (process step 114). Then, in process step 116, the plastic material 60 is injected into the tool 56 or injected onto the formed multilayer composite 20 through the channels 57 by means of the tool 56, whereby several plastic elements serving as reinforcement, connection or stiffening elements 18 are produced, forming the sandwich component 10. The stiffening elements 18 and connection elements can, for example, be provided as stiffenings or reinforcements on the sandwich component 10 in the form of ribs or even in the form of partial component regions formed in another way. The fixing of the stiffening elements 18 can, for example, occur by an injection into the so-called KIS technology (KIS: Konsolidierung im Spritzgusswerkzeug (consolidation in the injection molding tool). After the injection of the stiffening elements 18, the completed sandwich component 10 is demolded and removed from the tool 56 together with the stiffening elements 18.

Figure 3A:
FIGS. 3a-3d are schematic sectional depictions of different embodiments of the cover layer.
Figure 3B:
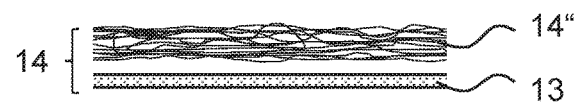
Figure 3C:
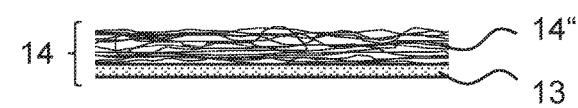
Figure 3D:

FIGS. 3a-3d show examples of different embodiments of the cover layer 14. In the exemplary embodiment of FIG. 3a, the cover layer 14 consists of an unconsolidated hybrid textile 14", which contains thermoplastic portions (in particular in the form of thermoplastic fibers) and reinforcing fibers. The hybrid textile 14" can in particular be a non-woven material, a fibrous web, a woven material or a scrim. In the exemplary embodiment of FIG. 3b, the cover layer 14 comprises, besides the hybrid textile 14", a melt layer in the form of a thermoplastic; this embodiment of the cover layer 14 is also depicted in FIGS. 2a and 2b. In the embodiment of FIG. 3c, the melt layer 13 is connected fixedly to, for example is formed to or adhered to, the hybrid textile 14''. The exemplary embodiment of FIG. 3d, however, shows a cover layer in which the melt layer 13 is formed by thermoplastic fibers which are added to the remaining hybrid textile 14'' or are integrated into the hybrid textile 14'' in such a way that an enrichment of the thermoplastic portion is present in an outer side of the cover layer 14 (which is adjacent to core layer 12 in the multilayer composite 20).

Figure 1B:
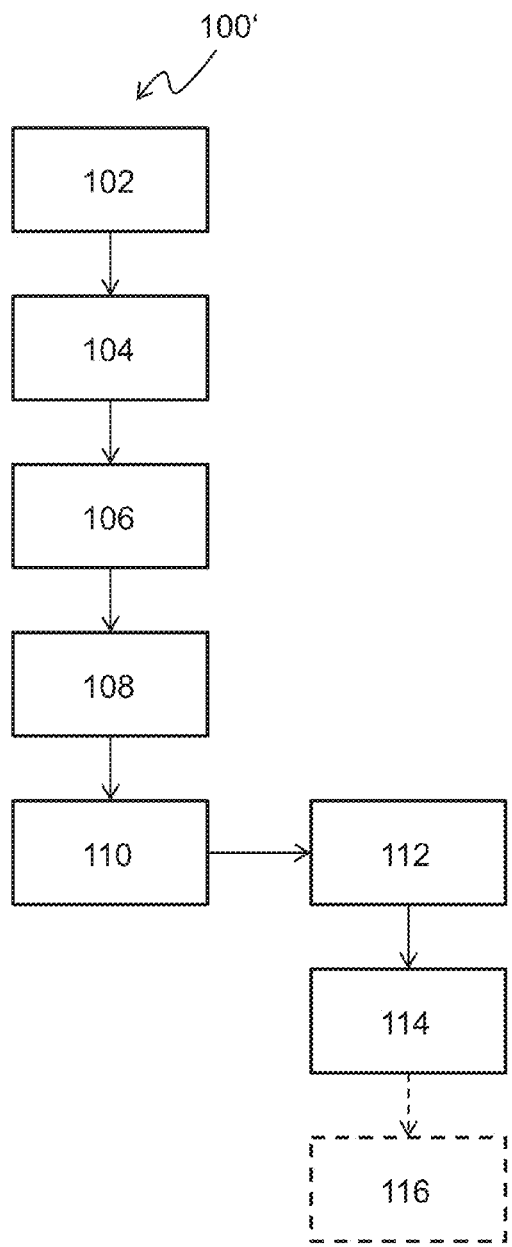
FIG. 1b is a diagram of an alternative method sequence for producing a sandwich component, in which firstly a semi-finished product is produced from a multilayer composite made from a foamed core layer and a cover layer, said semi-finished product then being heated in a heating device and formed in a forming tool.

FIG. 1b shows a flow diagram of an alternative method course 100' for producing the sandwich component 10 in which firstly a semi-finished product 30 is produced from the foamed core layer 12 and the cover layer 14 (and if necessary further layers), which is then supplied to the finishing device 50 and there—analogously to the method course of FIG. 1a—is heated in the heating device 52 and formed in the forming tool 54.

Figure 4A:
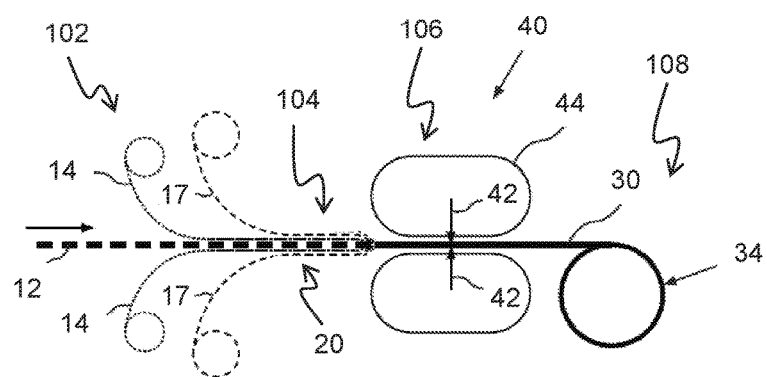
FIG. 4a is a schematic depiction of a semi-finished product production according to the method sequence of FIG. 1b.
Figure 4B:
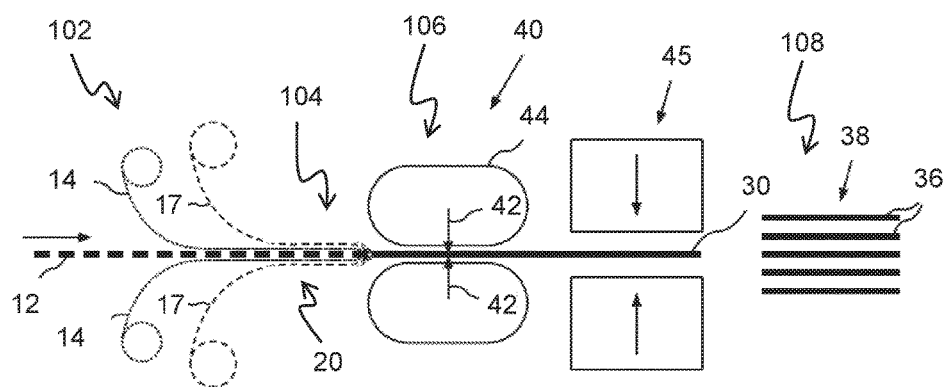
FIG. 4b is a schematic depiction of an alternative embodiment of the semi-finished product production according to method sequence 1b.

The associated partial process of the semi-finished product production is explained in more detail in FIGS. 4a and 4b. These figures show, in schematic depiction respectively, the provision of the at least one core layer 12, at least one cover layer 14 and at least one decorative layer 17 (process step 102), the layering of these individual layers into a multilayer composite 20 (process step 104) and the connection of these individual layers to a component semi-finished product 30 with a first heat supply 42 to a heated roller system 44 of a prefabrication device 40 (step 106). The adhesion of the decorative layer 17 is ensured by the softening of a thermoplastic portion of the cover layer 14 and can optionally be improved by a melt film (not depicted here) between the cover layer 14 and the decorative layer 17. Alternatively, the decorative layer 17 can be dispensed with since, in the case of high value/heat-sensitive decorations such as, for example, leather, the lamination is subsequently applied to the completed component in a classic manner.

These layers 12, 14, 17 on the one hand are pressed onto one another by means of the heated roller system 44 which can also be formed as a roller press, and on the other hand are connected to one another and partially consolidated with the heat supply 42, so by heating and at least local melting of individual layers. In the exemplary embodiment shown in FIG. 4a, in connection to the connection of the individual layers to form the semi-finished product 30, the semi-finished product 30 is rolled up into at least one semi-finished product roll 34 in the prefabrication device 40 (process step 108).

In the exemplary embodiment shown in FIG. 4b, the semi-finished product 30 is configured by means of a cutting device 45 of the prefabrication device 40 into several component parts 36 of the component semi-finished product 30 and at least one component part stack 38 is formed from these component parts 36 (process step 108).

During the production of the semi-finished product 30 according to the method depicted in FIGS. 4a and 4b, the connection of the individual layers (connection of the core layer 12, the cover layer 14 and potentially the decorative layer 17) occurs by means of thin melt films, whereby the advantage results that the production of the multilayer composite 20 does not have to be coupled directly to further processing steps—as shown in FIGS. 2a and 2b. The individual layers can be processed into the semi-finished product 30 in a preliminary stage (and rolled up or cut into desired lengths and stacked) and later unrolled or unstacked (process step 110) and supplied to the process steps of heating (step 112) and forming (step 114) shown in FIGS. 2a and 2b. The semi-finished product 30 does not differ in its handling from a single-layer material (e.g. from a foam layer or a non-woven material) and has very good forming properties. Therefore, manufacturers of pressed or injected components no longer have to have partly very costly sorting devices in order to be able to produce sandwich components.

The semi-finished product 30 produced according to FIG. 4a or 4b can also be transferred directly from the prefabrication device 40 into the finishing device 50 of FIG. 2a or 2b, wherein here the individual method steps of the prefabrication device 40 and a finishing device 50 must be coordinated with each other. Here, firstly the component semi-finished product 30 is formed by laying the core layer 12 and the cover layers 14 one on the other, firstly without the decorative layers 17. The component semi-finished product 30 is successively configured into the component parts 36 by means of the cutting tool 45, wherein the component parts 36 are not—as shown in FIG. 4b—stacked, but rather successively heated in the finishing device 50 connected to the prefabrication device 40 with a (second) heat supply 52, the respective layers are transferred into a plastic state and then are formed and cut by means of a tool 54 or 56 of the finishing device 50, wherein, for example, (with increased production cost) the decorative layer 17 can be applied. The component cutting here occurs during the closing of the tool after the application of the decorative materials or after the forming or cooling or by integrated cutting edges/pinched edges in the tool 54, 56.

Alternatively, the production of the sandwich component 10 from the component part 36 or from an unrolled part of the semi-finished product roll 34 which is configured according to need can occur. The component semi-finished product 30 already comprises, in this case, the core layer 12, the two cover layers 14, the two decorative layers 17 and potentially melt layers (not shown in FIGS. 4a and 4b) arranged therebetween (see FIG. 4a or 4b). These individual layers are already connected to one another as a consequence of the (first) heat supply 42 in the prefabrication device 40. The component semi-finished product 30 or the component part 36 thereof therefore already contains all necessary layers, whereby the individual layers are only transferred into the plastic state with the second heat supply 52 by the finishing device 50 and the thus resulting sandwich component 10 is deformed according to need by means of the tool 54 or 56.—Alternatively, however, it is also possible to insert the cold decorative layer 17 together with the heated (remaining) semi-finished product into the contoured forming tool 54.

During connection of the layers 12, 14, 17 of the multilayer composite 20 in the course of the semi-finished product production, both a structural and a surface consolidation of the cover layers 14 can occur. During the structural consolidation, the layer composite 20 is heated locally and the thermoplastic portion is melted.

Figure 5A:
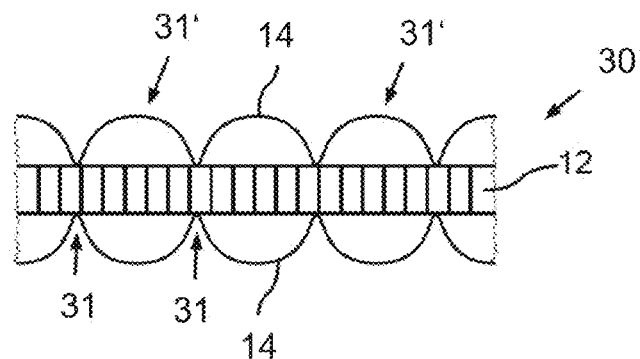
FIG. 5a is a schematic side sectional view of a semi-finished product which consolidated regions which are partly consolidated more strongly and partly more weakly.

In FIG. 5a, by way of example, a cross-sectional view of a structurally consolidated semi-finished product 30 is shown having a core layer 12 and a cover layer 14. The cover layer 14 is only strongly consolidated in the depressions 31; the thermoplastic portion therefore melted. In the region of the elevations 31', the cover layers 14, however, are only consolidated weakly or are almost not consolidated at all. The production of a connection between the cover layers 14 and the foamed core layer 12 therefore occurs substantially by melting the thermoplastic material in the depressions 31. The depicted structure of the semi-finished product 30 is to be understood only by way of example and can additionally also have further different structural embodiments. The structural consolidation has the advantage that the thus produced semi-finished product 30 is still formable and, for example, can be stored in roll form, and therefore can be supplied as continuous material to a production for fiber composite components.

Figure 5B:
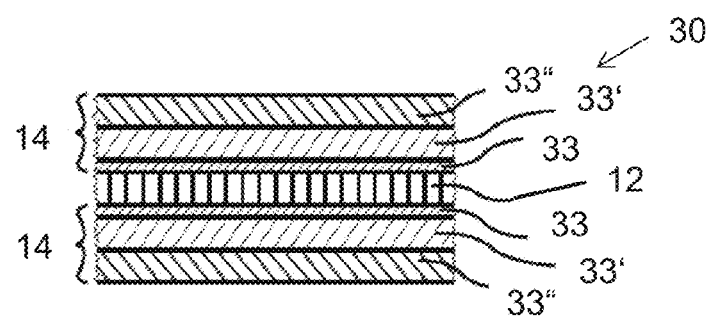
FIG. 5b is a schematic side sectional view of an alternative embodiment of the semi-finished product.

In the case of a surface consolidation, however, the entire fiber-reinforced thermoplastic cover layer 14 is consolidated evenly, as depicted in the schematic sectional view in FIG. 5b. Here, a consolidation of the cover layers 14 is sought between the unconsolidated and completely consolidated state. Presently, three different regions 33, 33', 33" are marked. The region 33 is completely consolidated, the region 33' is strongly consolidated and the region 33" is unconsolidated. Overall, such a consolidation is to be selected which enables a sufficient connection of the cover layers 14 to the foamed core layer 12, but at the same time does not damage this. Due to the consolidation of the cover layers 14, the thus produced semi-finished product 30 can only be brought into roll form with difficulty, because of which the plate form is suitable as a semi-finished product form 30 in the case of a surface consolidation.

Figure 5C:
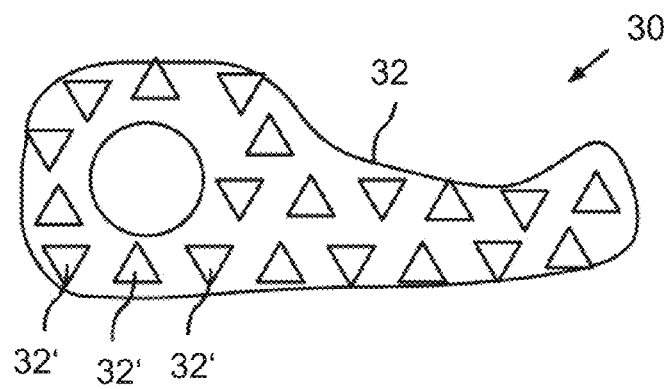
FIG. 5c is a schematic top view onto a further alternative embodiment of the semi-finished product.

In FIG. 5c, the semi-finished product 30 is depicted in an already preconfigured formation in a schematic top view. An edge region 32 can here be squeezed such that the individual layers 12, 14 are brought together and connected to one another by so-called pinched edges. In addition to such a closed edge finish or also alternatively to an open cut edge, several structural consolidation surfaces 32 can be introduced. The shape and design of these consolidation surfaces 32 can here be selected substantially in any manner, depending on which mechanical properties the semi-finished product 30 and the fiber composite component to be produced therefrom is to have. The production of the semi-finished product 30 depicted schematically in FIG. 5c can likewise occur continuously or discontinuously.

Alternatively to the embodiments depicted in FIGS. 4 and 5, in which the connection of the individual layers 12, 14 of the semi-finished product 30 occurs by heat supply 42, so thermally, the individual layers 12, 14 can also be connected to one another mechanically. This is depicted by way of example in FIGS. 6a and 6b by means of the needling of the individual layers 12, 14.

FIG. 6a shows a schematic side view of a prefabrication device 40' for producing a semi-finished product 30' is shown in FIG. 6. A fiber mixture 70 of thermoplastic fibers and reinforcing fibers is provided on the prefabrication device 40'. The fiber mixture 70 is guided through a so-called carding machine 72. The fiber mixture 70 is parallelized and purified by means of the carding machine 72 included in the prefabrication device 40' such that the carding machine 72 outputs a fibrous web 14' in the form of a continuous material which is here used as a cover layer 14.

A core layer 12 comprising a foamed plastic, preferably PET, as well as a thermoplastic melt layer 13 produced, for example, from polypropylene, are likewise provided in the form of continuous materials. The fibrous web 14', the thermoplastic melt layer 13 and the core layer 12 are arranged one on the other and are further conveyed to a plurality of needles 76. The needles 76 have respective barbs 78. The needles 76 studded with the barbs 78 are guided through or stuck through the multilayer composite 20 formed from the fibrous web 14', the thermoplastic melt layer 13 and the core layer 12. Then the guided-through needles 76 are in turn pulled out from the core layer 12, the fibrous web 14' and the thermoplastic melt layer 13, whereby single or multiple fibers of the fibrous web 14' are hooked the barbs 78 and are mechanically anchored to the core layer 12 and the thermoplastic melt layer 13 during pulling out of the needles 76.

In other words, a needling of the fibrous web 14' with the thermoplastic melt layer 13 and the core layer 12 occurs. Then the layers which have been needled to one another and which form the semi-finished product 30' are rolled up in the form of a roll 34', which is able to be transported and stored particularly easily.

In FIG. 6b, an alternative embodiment of the prefabrication device 40' as well as an alternative method for producing the semi-finished product 30' is shown in a schematic side view. The method shown here differs from the method mentioned in connection to FIG. 6a in that, after the needling of the fibrous web 14' with the melt layer 13 and the core layer 12, a pre-assembly of the semi-finished product 30' into respective semi-finished product component parts 36', for example into plate form, is carried out by means of a cutting tool 45'. The semi-finished product component parts 36' can then, for example, be stacked one on the other and brought into interim storage.

In FIG. 6c, a further alternative sequence of method steps for producing the semi-finished product 30' is shown. The method course shown here differs from the method course shown in FIG. 6b only in that the core layer 12 is provided in the form of preconfigured component parts and not as a continuous product.

Figure 7A:
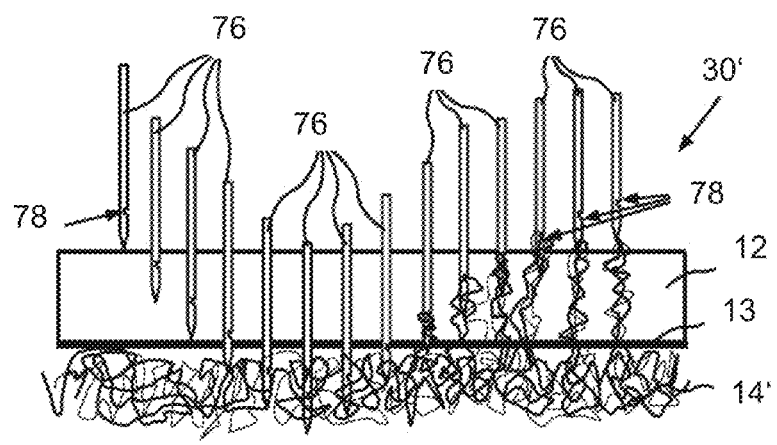
FIG. 7a is a schematic detailed view of the semi-finished product during the production thereof, wherein a plurality of needles provided with barbs are guided through respective layers of the semi-finished product and are pulled out from this again.

In FIG. 7a, the needling process to form the semi-finished product 30' is depicted again in detail in a schematic detailed view. As can be recognized, the individual needles 76 having their respective barbs 78 are completely immersed through the core layer 12, through the melt layer 13 and the fibrous web 14'. Then, the needles 76 are pulled out again in the opposite direction from the individual layers 12, 13, 14', wherein single or also multiple fibers of the fibrous web 14' hook into the respective barbs 78 and, during pulling out of the needles 76, are guided through the thermoplastic melt layer 13 and the core layer 12. The individual fibers are hereby mechanically, i.e. due to a mechanical anchoring, connected to the thermoplastic melt layer 13 and the core layer 12.

Figure 7B:
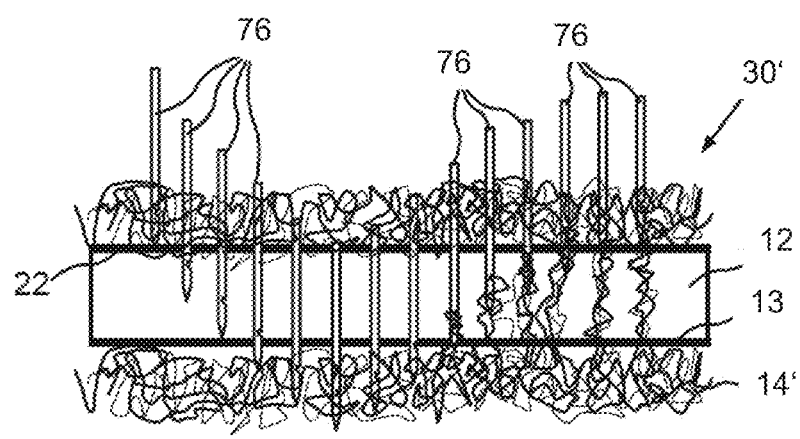

In FIG. 7b, an alternative arrangement of the individual layers 12, 13, 14' is shown during their needling. Here, the entire multilayer composite 20, consisting of the fibrous web layers 14' arranged on the outer side respectively, and the thermoplastic melt layers 13 arranged therebetween, as well as the core layer 12, are connected to one another. The individual needles 76 are here immersed through all layers 12, 13, 14' in turn and are then pulled out again in the opposite direction, wherein, in turn, single or multiple fibers of the fibrous web 14' are hooked with the respective barbs 78 and are mechanically connected to the thermoplastic melt layers 13 and the core layer 12 during pulling out of the needles 76.

Figure 8A:
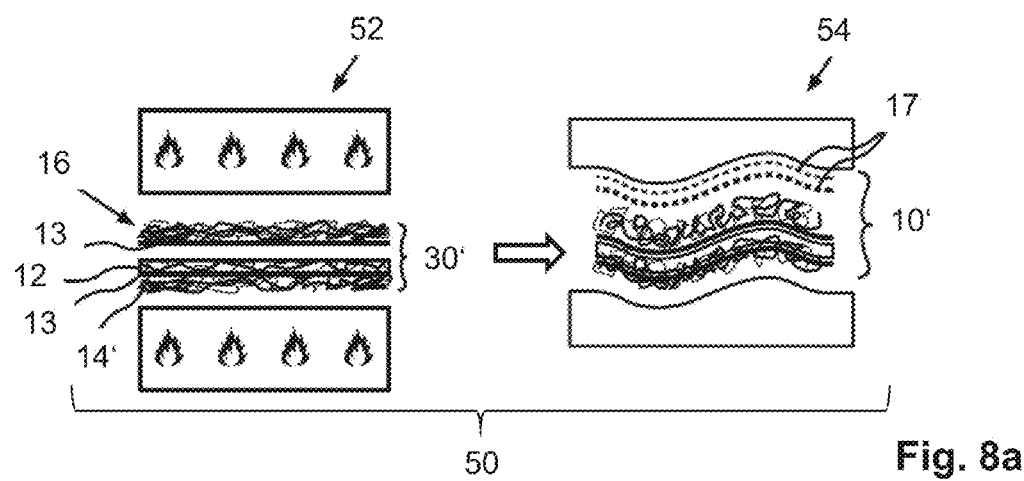
FIG. 8a is a schematic depiction of a method sequence for producing a sandwich component, wherein a heating system to heat the semi-finished product and a tool to produce a sandwich component from the heated semi-finished product are shown.

In FIG. 8a, a method sequence for producing a sandwich component 10' from the semi-finished product 30' in a finishing device 50 is depicted. To produce the sandwich component 10'—analogously to the exemplary embodiment of FIG. 2a—a heating device 52 as well as a forming tool 54 formed as a press is used. The semi-finished product 30' can here optionally be provided to the heating device 52 in the form of the roll 34' or also in the form of the preconfigured semi-finished product component parts 36'. Optionally, here an additional layer 16 serving as an upper layer can be attached to the semi-finished product 30'. The additional layer 16 can likewise be provided in the form of a non-woven material or a fibrous web. The additional layer 16 here has a higher melting temperature than the thermoplastic fibers of the fibrous web 14'.

The semi-finished product 30' together with the additional layer 16 is heated in the heating device 52 above the melting temperature of the thermoplastic melt layer 13 and/or the thermoplastic portion of the fibrous web 14'. The heating can here occur convectively, conductively or by heat radiation. The thus heated semi-finished product 30' is then arranged in the forming tool 54. Here, optionally, further cover layers or also optional melt layers can also be attached to the semi-finished product 30'.

Then the semi-finished product 30' softened by the heating is formed in the tool 54 serving as a thermoforming press, cooled and if necessary cut, wherein here, optionally, further decorative layers 17 can be attached to the semi-finished product 30' before the completed sandwich component 10' is removed from the forming tool 54.

In FIG. 8b, an alternative method sequence for producing the sandwich component 10' is shown. The semi-finished product 30' is in turn (potentially together with one or several additional layers 16) heated in the heating device 52 before it is supplied to the tool 56. The tool 56 is presently formed as a transfer molding tool and has one or more channels 57 to supply an injection molding material 60. The injection molding material 60 can here contain filler or even reinforcing materials.

The heated semi-finished product 30' together with the additional layer(s) 16 is formed by means of the tool 56 and then cooled, wherein after the cooling or during the tool closing, a component cutting can optionally occur using integrated cutting edges. During or after the cooling, several rib-like elements 18' or partial component regions are injected onto the sandwich component 10'. The elements 18' can, for example, serve as additional stiffenings or as connection elements for connecting the sandwich component 10' to other components. Finally, the completed sandwich component 10' is demolded together with the elements 18' and can be removed from the tool 56.

The sandwich component 10, 10' can, for example, serve as an inner trim component in a motor vehicle. For example, the sandwich component 10, 10' can be used as a door inner trim part or similar. Due to the sandwich-like construction, the sandwich component 10, 10' has a particularly low specific weight with, at the same time, good mechanical properties.

Instead of the shown roll-shaped initial materials and/or continuous materials used, alternatively cut-to-length pre-configured material cuttings can be present.

The invention claimed is:

1. A method for producing a sandwich component, comprising the steps of:
   providing a foamed core layer made from a foamed polyethylene terephthalate plastic and having a first melting temperature, and a cover layer which includes reinforcing fibers and polypropylene plastic fibers having a second melting temperature, wherein the first melting temperature is higher than the second melting temperature;
   arranging the foamed core layer on the cover layer to form a multilayer composite;
   heating the multilayer composite and/or a semi-finished product produced from the multilayer composite in a heating device of a finishing device to a temperature which is lower than the first melting temperature and higher than the second melting temperature; and
   forming the heated multilayer composite and/or the semi-finished product in a forming tool of the finishing device to produce the sandwich component.

2. The method according to claim 1, wherein the cover layer comprises a thermoplastic, fiber-reinforced, textile structure.

3. The method according to claim 2, wherein the textile structure is a non-woven material or a woven fabric made from reinforcing fibers and thermoplastic fibers.

4. The method according to claim 2, wherein the cover layer is a hybrid non-woven material.

5. The method according to claim 4, wherein the hybrid non-woven material is a hybrid needle-punched non-woven material, said hybrid needle-punched non-woven material being at least partially consolidated by a compression force.

6. The method according to claim 1, wherein the cover layer comprises a melt layer made from a thermoplastic having a third melting temperature that is lower than the first melting temperature and as a maximum as high as the second melting temperature, and the melt layer is arranged between the core layer and a fiber portion of the cover layer during formation of the multilayer composite.

7. The method according to claim 6, wherein the melt layer and the plastic fibers of the cover layer consist of polypropylene.

8. The method according to claim 6, further comprising the step of arranging a decorative layer on the cover layer, forming the multilayer composite.

9. The method according to claim 8, wherein the decorative layer is arranged together with a further melt layer made from the same thermoplastic as the melt layer on the cover layer, forming the multilayer composite.

10. The method according to claim 1, further comprising the step of connecting the core layer and the cover layer of the multilayer composite in regions to a semi-finished product.

11. The method according to claim 10, further comprising the steps of:
    producing the semi-finished product as a continuous material; and
    arranging the continuous material as a semi-finished product roll.

12. The method according to claim 11, further comprising the step of connecting the core layer and the cover layer of the multilayer composite in a prefabrication device with a heat supply.

13. The method according to claim 12, wherein the core layer and the cover layer of the multilayer composite are at least partially connected to one another by local melting of the cover layer, and the at least partially connected core layer and cover layer of the multilayer composite are preconfigured into the semi-finished product.

14. The method according to claim 12, further comprising heating the core layer and the cover layer of the multilayer composite at least one of conductively, convectively, and via radiation heat while conveying the multilayer composite.

15. The method according to claim 12, wherein the core layer and the cover layer of the heated multilayer composite are connected to one another discontinuously by a cold pressing tool.

16. The method according to claim 10, further comprising the step of providing the semi-finished product as configured semi-finished product component parts.

17. The method according to claim 10, further comprising the steps of:
    rolling the semi-finished product up into semi-finished product rolls;
    providing the semi-finished product rolls to the finishing device by unrolling the semi-finished product rolls and distributing the unrolled semi-finished product rolls into several unrolled parts; and cutting the semi-finished product directly in the finishing device in a subsequent process step.

18. The method according to claim 17, wherein the semi-finished product is cut directly in the forming tool.

19. The method according to claim 10, further comprising the steps of:
configuring the semi-finished product into several semi-finished product parts;
stacking the semi-finished product parts to form a semi-finished product part stack;
providing the semi-finished product to the finishing device by unstacking the semi-finished product parts; and
cutting the semi-finished product directly in the finishing device in a subsequent process step.

20. The method according to claim 10, wherein the cover layer comprises at least one of a fibrous web and fibrous non-woven material, and further comprising the step of:
connecting the at least one of the fibrous web and the fibrous non-woven material and the core layer by sticking at least one needle having a barb into the core layer and the at least one of the fibrous web and the fibrous non-woven material and then guiding out the needle from the core layer and at least one of the fibrous web and the fibrous non-woven material such that, during at least one of piercing and pulling out of the needle, fibers of the at least one of the fibrous web and the fibrous non-woven material are hooked with the barb and anchored to the core layer mechanically.

21. The method according to claim 1, further comprising connecting at least one plastic element to the sandwich component with a connection tool of the finishing device.

22. The method according to claim 1, wherein the sandwich component is an inner trim component for a motor vehicle.

* * * * *